United States Patent [19]

Despouys

[11] Patent Number: 4,696,538

[45] Date of Patent: Sep. 29, 1987

[54] OPTICAL FIBER CONNECTOR AND METHOD OF MECHANICALLY CENTERING AN INTERIOR ELEMENT IN AN OUTER BODY

[75] Inventor: Jean-Bernard Despouys, Paris, France

[73] Assignee: Radiall Industrie, Rosny-Sous-Bois, France

[21] Appl. No.: 733,318

[22] Filed: May 13, 1985

[30] Foreign Application Priority Data

May 11, 1984 [FR] France ............................... 84 07300

[51] Int. Cl.[4] .............................................. G02B 6/36
[52] U.S. Cl. .................................. 350/96.20; 350/320
[58] Field of Search ................... 350/96.20, 96.21, 320

[56] References Cited

U.S. PATENT DOCUMENTS 3,954,338  5/1976  Hennel et al. ............... 350/96.21 X
4,300,815  11/1981  Malsot et al. ................... 350/96.20
4,456,334  6/1984  Henry et al. ........................ 350/320

FOREIGN PATENT DOCUMENTS 2486664  1/1982  France ............................... 350/96.20
2488699  2/1982  France ............................... 350/96.20

Primary Examiner—John Lee
Attorney, Agent, or Firm—Arnold, White & Durkee

[57] ABSTRACT

A connector ferrule body has a flat inner surface perpendicular to its axis and at one end of an axial cavity in the ferrule body. A hub has an opening in which an optical fiber is fastened so the fiber extends perpendicular to a flat end face. The flat end face of a hub is seated on the flat surface of the ferrule body and held against the flat surface of the ferrule body by a spring. Openings in the side wall of the ferrule body permit insertion of tools to slide the hub radially on the flat surface of the ferrule body to precisely position the optical fibre within the body. The spring holds the hub in the adjusted position.

6 Claims, 2 Drawing Figures

OPTICAL FIBER CONNECTOR AND METHOD OF MECHANICALLY CENTERING AN INTERIOR ELEMENT IN AN OUTER BODY

The present invention relates to a process for mechanically locking an interior element, particularly cylindrical, in an exterior body, particularly tubular, while allowing subsequent adjustment of the radial position of the interior element by microdisplacements under the action of precision maneuvering or displacing means through radial holes or bores of the exterior body. The process according to the present invention can be used, by way of a non-limiting particular example, to adjust and immobilize an optical fiber in a connector ferrule, the interior element then preferably being a tubular, cylindrical element, preferably of metal and particularly of steel, inside which the optical fiber is immobilized, preferably by gluing or cementing, the exterior body then being a ferrule body.

BACKGROUND OF THE INVENTION

Connectors with which the present invention can be used and their adjustment techniques are described in U.S. application Ser. No. 366,707 (French application No. 82 08464) and U.S. application Ser. No. 595,443 (French application No. 83 05422) of Applicant's Assignee. The disclosures of U.S. Ser. Nos. 366,707 and 595,443 are incorporated herein by reference.

U.S. Ser. No. 366,707 discloses an optical fiber connector using, as mechanical locking means, a plurality of balls force-fitted in the radial holes of the exterior or ferrule body and which press against the interior tubular element in which an optical fiber is placed.

U.S. application Ser. No. 595,443 discloses a mechanical locking means, in which deformable elements engaged in the radial holes of the exterior body, and which are preferably made of a soft metal, are compressed and deformed by means of punches placed in the radial holes so as to fill the spaced in the region of the holes between the periphery of the interior element and the facing interior wall of the exterior body.

As disclosed in the above-mentioned patent applications, once the interior element is mechanically locked in the exterior body, mechanical action by means of maneuvering or adjusting means, such as punches, is applied to the balls or the metal core formed by crushing the deformable elements, causing microdisplacements by flexion of the interior element with respect to the exterior body. This results in adjustment of the radial position of the end of an optical fiber placed in the interior element, relative to the axis of the exterior body.

Although they provide overall satisfaction, the processes of mechanical locking described in the prior applications nevertheless have the disadvantage that due to the pressing of the balls in the radial holes of the exterior body, or elasticity of the metal of the deformable core, a slight instability in practice, however, less than 2 $\mu$m, occasionally appears after adjustment.

Moreover, as a result of the adjustment, the angle of inclination of the fiber relative to the connector axis varies with the distance of the end face of the fiber to the surface of the ferrule body from which the fiber held in the interior element extends. This surface, which is preferably conical, coacts, as is described in the prior applications, with a spherical surface of an abutment body for aligning the fibers to be connected.

U.S. Pat. No. 3,954,338 also describes a process for radial positioning of an optical fiber contained in an interior element in a connector body by means of radial adjustment screws. An elastic sheath is interposed between the connector body and a sleeve surrounding the interior element. The clearance between the interior element and the sleeve and the elasticity of the sheath connecting the sleeve to the exterior body results in a very high imprecision of the radial positioning of the fiber and very great instability during adjustment.

SUMMARY OF THE INVENTION

The present invention provides a process ensuring the mechanical locking of an interior element, in an exterior body, which is simple and rapid to carry out and which, in the field to position an optical fiber in an exterior body, allows a precise and particularly stable adjustment.

The process according to the invention is essentially characterized by the fact that there is formed in an interior cavity of the exterior body, near the zone of the radial holes, a flat shoulder or surface perpendicular to the longitudinal axis of the exterior body, that there is placed and immobilized around the interior element, a rigid hub of a size to be contained in the cavity, and having a flat front shoulder or surface perpendicular to the axis of the interior element, and that an elastic axial force is exerted on the hub, so as to press into mutual contact the flat surfaces of the exterior body and of the hub connected to the interior element. In this position, a peripheral surface of the hub, is located opposite and in facing relation to the radial holes of the exterior body.

The elastic pressure is preferably exerted by a helicoidal compression spring one end of which presses on a shoulder of the hub parallel and axially opposite to the flat surface. The other end of the spring seats against a wall forming the back face of the cavity, and which is parallel to the flat front surface or shoulder.

Preferably, as in the prior patent applications of the Applicant's Assignee listed above, four radial holes are provided spaced equiangularly (in cross shape) in the exterior body, i.e. at 90° around the body.

The process just described may advantageously be used to position an optical fiber in a connector ferrule including a cylindrical tubular element which constitutes the interior element described above, and which is placed in a tubular ferrule body, so that the inner element extends axially from the body. The process according to the invention is used to ensure the retention of the interior element in the ferrule body. Then an optical fiber is immobilized, preferably by gluing or cementing the end, in the interior element. Then by action of the micrometric screws engaged in the radial holes of the ferrule body, microdisplacements of the interior element are achieved to radially adjust and precisely center the fiber in the ferrule body which is then used in a connector assembly.

The adjustment operations are similar to those fully described in U.S. applications Ser. Nos. 366,707 and 595,443 and will not be fully discussed in detail here.

According to one characteristic of the invention, the action of the maneuvering means in the form of micrometric screws engaged in the radial holes, by pressing on the peripheral surface of the hub causes the mutually-engaging flat surfaces of the hub connected to the interior element, and of the cavity of the ferrule body to slide surface over surface.

During these adjustment operations the fiber thus undergoes only transverse movements and consequently retains its angular alignment with respect to the axis of the connector, i.e. remains parallel to the axis of the ferrule body.

In addition, the adjustments to be made are of small amplitude and the transverse elastic return of the spring pressing the hub against the front surface of the ferrule body is negligible relative to the pressure of the axial contact at the facing surfaces. The resulting mechanical constraints are thus normal to the surface of mutual pressures and there is no risk of destabilization of the adjustment with time.

Finally, the condition of the facing engaging surfaces which can be machined with great precision, is such that the precision of displacement of the hub connected to the interior element, with respect to the exterior ferrule body is on the order of several tenths of a micrometer.

Once the adjustment operations have been carried out, the interior element can be wholly immobilized in the exterior body by introduction of a mass of cement such as a resin, through the radial holes of the exterior ferrule body.

In order to make the invention better understood, particular embodiments will now be described by way of non-limiting examples, with reference to the accompanying drawings.

DETAILED DESCRIPTION

The drawings illustrate the process according to the invention for the manufacture of a male connector ferrule, and the resulting ferrule.

The ferrule 1 has an outer body 2 with a counter-sunk or hollow frustoconical end 3.

Figure 1:
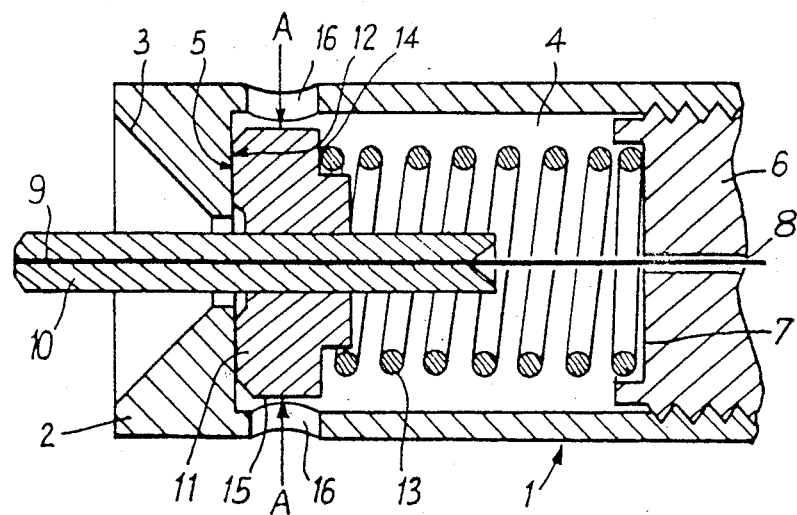
FIG. 1 is a partial view in axial section of a connector ferrule according to the invention and which is used in the process of the invention.

The body 2 has an axial bore forming a longitudinal cavity 4 having a flat surface 5 perpendicular to the longitudinal axis of body 2. As shown in FIG. 1, surface 5 is an annular shoulder and faces away from end 3.

Cavity 4 is closed at its rear portion by a part 6 threadedly connected to body 2, and which has an end wall 7 perpendicular to the axis of the body. Part 6 has a small diameter axial conduit or bore 8 for the passage of an optical fiber 9.

As can be seen from the drawings, optical fiber 9 is positioned in an interior tubular metal element 10 which is cylindrical and has an axial conduit for receiving the fiber 9. Fiber 9 is secured in interior element 10, preferably by gluing or cementing the fiber or its end to the element 10.

Before cementing the fiber 9 in element 10, a rigid hub 11 is positioned and is secured to element 10, preferably by soldering or welding. Hub 11 has a flat front surface 12 which is precisely perpendicular to its central bore. This bore is of a diameter to be a close sliding fit on the inner element 10 so that the axial conduit in element 10 which receives the fiber 9, and therefore the fiber 9 itself, is substantially precisely perpendicular to flat front surface 12 of the hub. Front surface 12 engages flat against surface 5 of body 2, and is pressed against surface 5 by a helicoidal spring 13 compressed between a rear shoulder 14 of hub 11 and end wall 7 of part 6.

To assemble the connector ferrule of FIG. 1, optical fiber 9 is first threaded through opening 8 in part 6 (while part 6 is detached from outer body 2) and is then passed through spring 13. Fiber 9 is then threaded through the axial conduit in interior element 10 to which the hub has been assembled, as described above. The end of fiber 9 is then cemented to the inner element.

The assembly of hub 11, inner element 10, and fiber 9 is inserted into cavity 4 of outer body 2 (from right to left as shown at FIG. 1), spring 13 is seated on shoulder 14 of the hub, and part 6 is threaded into body 2 to compress spring 13 and thus firmly press flat front face 12 of the hub against flat face 5 of outer body 2. During such assembly, a centering jig can be used to approximately radially center inner element 10 in the body. Such a jig can have a conical end to engage conical surface 3 of the body and an opening to receive the projecting end of inner element 10, to approximately center the inner element and hub, as threaded part 6 is threaded into the outer body 2.

In the assembled locking position shown in FIG. 1, a peripheral surface 15 of the hub faces radial holes 16, preferably four in number, equiangularly spaced, and traversing the sidewall of body 2. The peripheral surface 15 is preferably parallel to the axis of hub 11, and can be cylindrical, or have flats formed thereon which are positioned perpedicular to the axes of the respective radial openings 16.

It will be understood that in the locking position shown it is possible by action of micrometer screws (not shown) adjusted in the direction of arrows A to cause microdisplacements of hub 11, and thus of fiber 9 immobilized in interior element 10 and fixed to the hub, with respect to outer body 2 so as to precisely radially center the fiber 9 in body 2. Such adjustment operations are described in detail for the connectors disclosed in the two prior U.S. applications Ser. Nos. 366,707 and 595,443 of Applicant's Assignee.

Once the adjustment operations are finished, it is possible to ensure complete immobilization of the fiber in the connector ferrule by injection of adhesive or hardening resin through the radial holes 16 in cavity 4 so as to coat hub 11 and connect it to body 2.

According to the invention, monomode or single optical fibers can be connected with precision of position of the fiber less than 0.5 μm, this precision being maintained in remarkably stable fashion over time.

Figure 2:
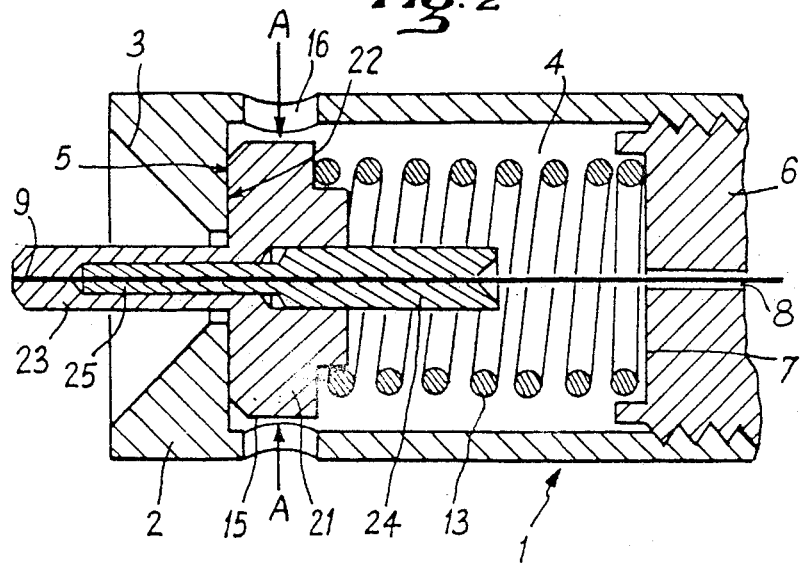
FIG. 2 is a view similar to FIG. 1 of a second embodiment, according to the invention.

The stability of precision can be still further improved with the connector ferrule and mounting arrangement of the embodiment of FIG. 2, in which the hub has a body 21 with a flat reference shoulder 22 and has an axial extension 23. Interior element 24 in this embodiment has an axial extension 25 which engages in an additional or pilot bore of extension 23 of the hub.

Thus, the axial projection within the conical front recess 3, is made as a single piece with the body of the hub, and not as in the first embodiment in the form of a separate inner element 10 connected by soldering to the hub. In this case, greater mechanical stability is obtained during temperature variations.

In the embodiment of FIG. 2, the fiber 9 can be cemented to extension 23, and the portions 24 and 25 of the inner element can be cemented in the extension 23 and bore of hub 21.

During such precise radial centering adjustment the entire hub 11 and inner element 10, together with fiber 9, are shifted radially but do not tilt, because flat shoulder 22 of the hub slides on flat surface 5 of body 2. Precise parallelism of the fiber 9 with the axis of body 2 is therefore maintained. The slight flexing of the free portion of fiber 9 between the inner end of interior element 11 and end wall 7 has no adverse effects.

Although the invention has been described in connection with particular embodiments, it is of course in no way thereby limited, and numerous changes and variations can be made without departing from the scope or spirit of the invention. In addition, the invention is in no way limited to the application described.

I claim:

1. An optical fiber ferrule assembly comprising an outer body having an axially extending cavity, a plurality of generally radially extending circumferentially spaced apart openings communicating with the axially extending cavity, and a flat surface at one end of the cavity perpendicular to the axis of the body, a hub having an axial opening and a flat face perpendicular to its axial opening, means for securing an optical fiber in the axial opening of the hub, said hub being of a size to be received in said cavity, said hub having a flat face seatable on said flat surface of said outer body, means within said outer body for elastically pressing said hub against said body, and surface means on said hub in the region of said radial openings for engagement by a tool to displace said hub and fiber perpendicular to the axis of the body by sliding the face of the hub on the surface of the body, to adjust the radial position of the hub and fiber in the body.

2. A method of mechanically locking an interior element within an opening of an outer body in a precise radial position comprising the steps of: providing a rigid outer body having an axially extending cavity, a flat surface within the body perpendicular to the axis of the body and at one end of the cavity, and a plurality of generally radial circumferentially spaced apart openings extending through the outer body and communicating with the interior of the axially extending cavity at a location near said flat surface, providing a rigid hub having an axial opening and a flat face perpendicular to the axis of the axial opening and extending around the opening, securing an element in the axial opening of the hub, inserting the hub and element into the cavity with the flat face of the hub seated on the flat surface of the body, elastically pressing the hub axially of the outer body to press said flat face of the hub flat against the flat surface of the body, and then adjusting the radial position of the hub within the body with micro-displacement tools inserted through said radial openings of the body and into engagement with the periphery of the hub to slide the flat face of the hub radially on the flat surface of the body, while maintaining the elastic pressure so that the flat face of the hub is flat against the flat surface of the body after such radial adjustment, and the hub is retained in the adjusted position by the elastic pressure.

3. The method of claim 2 wherein said step of elastically pressing the hub against the body comprises, pressing the hub against the body with a helicoidal spring having one end seated on a surface of the hub parallel to the flat face of the hub, and an opposite end seated on a wall of the cavity.

4. A method of making a connector ferrule of the type having a ferrule body and an interior element for supporting an optical fiber comprising the steps of: providing a rigid outer body having an axially extending cavity, a flat surface within the body perpendicular to the axis of the body and at one end of the cavity, and a plurality of generally radial circumferentially spaced apart openings extending through the outer body and communicating with the interior of the axially extending cavity at a location near said flat surface, providing a rigid hub having an axial opening and a flat face perpendicular to the axis of the axial opening and extending around the opening, securing an optical fiber in the axial opening of the hub, inserting the hub and fiber into the cavity with the flat face of the hub seated on the flat surface of the body, elastically pressing the hub axially of the outer body to press said flat face of the hub flat against the flat surface of the body, and then adjusting the radial position of the hub within the body with micro-displacement tools inserted through said radial openings of the body and into engagement with the periphery of the hub to slide the flat face of the hub radially on the flat surface of the body, while maintaining the elastic pressure so that the flat face of the hub is flat against the flat surface of the body after such radial adjustment, and the hub is retained in the adjusted position by the elastic pressure.

5. The method of claim 4 wherein said step of elastically pressing the hub against the body comprises, pressing the hub against the body with a helicoidal spring having one end seated on a surface of the hub parallel to the flat face of the hub, and an opposite end seated on a wall of the cavity.

6. The method of claim 4 further comprising securing the hub to the outer body with a resin, after adjustment.

* * * * *